United States Patent
Popp et al.

(10) Patent No.: US 6,176,811 B1
(45) Date of Patent: Jan. 23, 2001

(54) INCREASED-SPONTANEITY AUTOMATIC GEAR BOX

(75) Inventors: Christian Popp, Kressbronn; Friedrich Tenbrock, Langenargen; Hansjörg Rosi, Meckenbeuren, all of (DE)

(73) Assignee: ZF Friedrichshafen AG, Friedrichshafen (DE)

(*) Notice: Under 35 U.S.C. 154(b), the term of this patent shall be extended for 0 days.

(21) Appl. No.: 09/381,108

(22) PCT Filed: Apr. 4, 1998

(86) PCT No.: PCT/EP98/01978

§ 371 Date: Sep. 15, 1999

§ 102(e) Date: Sep. 15, 1999

(87) PCT Pub. No.: WO98/45627

PCT Pub. Date: Oct. 15, 1998

(30) Foreign Application Priority Data

Apr. 10, 1997 (DE) .............................. 197 14 853

(51) Int. Cl.[7] .................................................. F16H 61/08
(52) U.S. Cl. ........................ 477/115; 477/121; 477/154
(58) Field of Search .................................. 477/115, 121, 477/143, 154

(56) References Cited

U.S. PATENT DOCUMENTS

| 4,955,257 | * | 9/1990 | Terayama et al. | 477/154 |
|---|---|---|---|---|
| 5,285,880 | | 2/1994 | Minagawa et al. | 192/3.58 |
| 5,505,100 | | 4/1996 | Mitchell et al. | 74/335 |
| 5,706,197 | * | 1/1998 | Stasik et al. | 477/115 |
| 5,941,795 | * | 8/1999 | Tsuchiya et al. | 477/143 |
| 5,957,810 | * | 9/1999 | Ohashi et al. | 477/154 |

FOREIGN PATENT DOCUMENTS

| 36 25 156 C2 | 2/1987 | (DE) . |
|---|---|---|
| 42 40 621 A1 | 6/1994 | (DE) . |
| 43 11 886 A1 | 10/1995 | (DE) . |
| 44 17 477 A1 | 11/1995 | (DE) . |
| 0 341 631 B1 | 11/1989 | (EP) . |
| 0 640 779 A1 | 3/1995 | (EP) . |

* cited by examiner

*Primary Examiner*—Sherry Estremsky
(74) *Attorney, Agent, or Firm*—Davis and Bujold

(57) ABSTRACT

A method for increasing the spontaneity is proposed for an automatic transmission, the gear shifts of which are carried out as overlapping gear shifts. Here an upshift from a first to a second gear is not completely terminated and a change back from an upshift to the first gear is carried out when an abort criterion is detected.

12 Claims, 4 Drawing Sheets

| Clutch - Logic | | | | | | | | |
|---|---|---|---|---|---|---|---|---|
| POS/GEAR | Clutch | | | | | | | Free Wheel |
|  | A | B | C | D | E | F | G | 1. G. |
| R = R-Gear |  | * |  | * |  |  | * |  |
| N = Neutral |  |  |  |  |  | * | * |  |
| D, 1. Gear | * |  |  |  |  |  | * | * |
| D, 2. Gear | * |  | * |  |  |  | * |  |
| D, 3. Gear | * |  | * |  |  | * |  |  |
| D, 4. Gear | * |  |  |  | * | * |  |  |
| D, 5. Gear |  |  | * |  | * | * |  |  |
| 1, 1. Gear | * |  |  | * |  |  | * | * |

\* - active

Fig. 2

INCREASED-SPONTANEITY AUTOMATIC GEAR BOX

BACKGROUND OF THE INVENTION

The invention concerns a method for increasing the spontaneity of an electrohydraulically controlled automatic transmission in which a gear shift is carried out while a first clutch opens and a second clutch closes.

In automatic transmissions, the gear shifts can be carried out as overlapping gear shifts while a first clutch opens and a second clutch closes. The pressure curve of the clutches taking part in the gear shift is determined via electromagnetic actuators by an electronic transmission control. Such control and regulation method is known, for ex., from DE-OS 42 40 621.

Gear shifts of the automatic transmission are usually triggered when a desired performance presettable by the driver, e.g. throttle valve position, an upshift or downshift characteristic line of a shift characteristic field, is exceeded. In addition to said gear shifts triggered by means of the accelerator pedal, the driver also has the possibility at any desired time to trigger manual gear shift. DE-OS 43 11 886, e.g. thus shows a device by which a driver can trigger gear shifts by means of a selector lever having a manual gate or switching levers on the steering wheel. In the practice, the problem arises, particularly in downshift with a subsequent upshift, that a sharp divergence appears between the driver's desired performance and corresponding acceleration capacity in relation to the adjusted gear of the automatic transmission. A typical example of this is when a driver intends to overtake another vehicle. At the start of the overtaking operation he will actuate the accelerator pedal so that the automatic transmission carries out a downshift. If the driver notices that he must interrupt the overtaking operation in view of the traffic coming from the opposite direction, he will release the accelerator pedal. The automatic transmission will first carry out a complete downshift, a retention time then elapses and only then does the upshift take place. This time lapse between the driver's desired performance and reaction thereto of the automatic transmission will be felt as disagreeable by a driver.

The problem on which the invention is based now consists in improving the spontaneity of an automatic transmission.

SUMMARY OF THE INVENTION

According to the invention, the problem is solved by the fact that during a downshift from a first to a second gear, the downshift is not completely terminated and a change to an upshift to the first gear takes place when an abort criterion is detected. The abort criterion is met with the detection of a demand for an upshift presettable by a driver.

The solution, according to the invention, offers the advantage that for the case from the practice described above, the actual characteristic of the transmission is closely linked to the driver's desired performance. The downshift is not fully carried out but is immediately interrupted after the driver signalizes this by his behavior. Compared to the prior art the automatic transmission thus acts more spontaneously.

In one development of the invention is proposed that during the downshift from the first to the second gear, when the abort criterion has been met, an admissibility be additionally tested. The admissibility is met when the actual transmission input rotational speed value is within a rotational speed range. The rotational speed range is here defined by a first and a second limit value wherein the first limit value constitutes a function of the synchronous rotational speed value of the first gear and the second limit value, a function of the synchronous rotational speed value of the second gear. In one other development is proposed that, in addition, it be tested whether the curve of the gradient of the transmission input rotational speed is within a preset rotational speed channel.

These two developments of the invention offer the advantage of it being additionally tested whether the curve of the gear shift is stable. Intermediate states critical to safety are thus detected in good time.

In another development, it is proposed that, upon issuance of the shift command for the first clutch, a time stage be started. The time stage extends up to a maximum time, a reduction time being coordinated with each value of the time stage. In development of this, it is proposed that a rapid filling time of the first clutch now is engaged in the upshift be changed depending on the reduction time. The development takes into account the circumstance that in a quick sequence of a downshift with subsequent upshift, the first clutch to be disengaged or is again engaged in the upshift is still partly filled. It is thus achieved by the variable rapid filling time that the first clutch only partly emptied comfortably close in the upshift without jolt.

BRIEF DESCRIPTION OF THE DRAWINGS

In the drawings is shown a preferred embodiment. In the drawings:

FIG. 2 is a table of the clutch logic;

FIGS. 3A–3E are time line diagrams of a first example, in which

FIG. 3A is a graph showing in the course of time the variable DKI, the driver's desired performance, for a downshift in traction followed by an upshift in coast, FIG. 3B is a graph showing in the course of time gear change command SB, for a downshift in traction followed by an upshift in coast, FIG. 3C is a graph showing in the course of time transmission input rotational speed curve nT, for a downshift in traction followed by an upshift in coast, FIG. 3D is a graph showing in the course of time the pressure curve of the first clutch pK1, for a downshift in traction followed by an upshift in coast, FIG. 3E is a graph showing in the course of time the pressure curve of the second clutch pK2, for a downshift in traction followed by an upshift in coast, and FIGS. 4A–4E are time line diagrams of a second example, in which FIG. 4A is a graph showing in the course of time the variable DKI, the driver's desired performance, for a traction downshift followed by coast downshift and a coast upshift, FIG. 4B is a graph showing in the course of time gear change command SB, for a traction downshift followed by coast downshift and a coast upshift, FIG. 4C is a graph showing in the course of time transmission input rotational speed curve nT, for a traction downshift followed by coast downshift and a coast upshift, FIG. 4D is a graph showing in the course of time the pressure curve of the first clutch pK1, for a traction downshift followed by coast downshift and a coast upshift, and FIG. 4E is a graph showing in the course of time the pressure curve of the second clutch pK2, for a traction downshift followed by coast downshift and a coast upshift.

DESCRIPTION OF THE PREFERRED EMBODIMENTS

Figure 1:
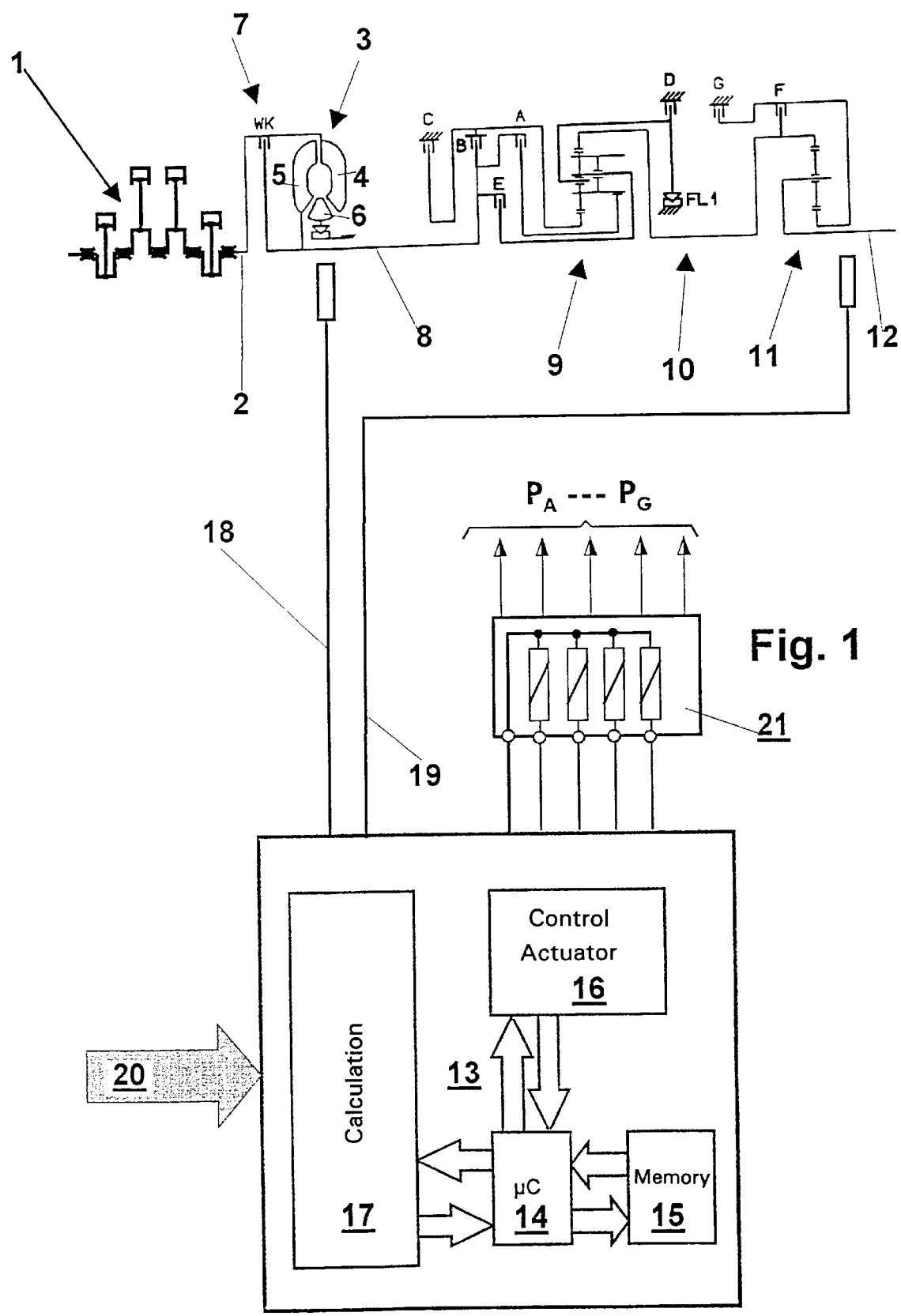
FIG. 1 is a system diagram.

FIG. 1 shows a system diagram of an automatic transmission. It consists of the intrinsically mechanical part, a hydrodynamic converter 3, a hydraulic control unit 21 and an electronic transmission control 13. The automatic transmission is driven by a driving unit, preferably internal combustion engine, via an input shaft 2. The transmission is non-rotatably connected with the impeller 4 of the hydrodynamic converter 3. As it is known, the hydrodynamic converter 3 comprises an impeller 4, a turbine wheel 5 and a stator 6. Parallel with the hydrodynamic converter 3 is situated a converter clutch 7. The converter clutch 7 and the turbine wheel 5 lead to a turbine shaft 8. When the converter clutch 7 is actuated, the turbine shaft 8 has the same rotational speed as the input shaft 2. The mechanical part of the automatic transmission consists of clutches and brakes A to G, a free wheel 10 (FL1) a Ravigneaux set 9 and a rear-mounted planetary gear set 11. The output takes place via a transmission output shaft 12. The latter leads to a differential, not shown which, via two axle half shafts, drives the input gears of a vehicle, not shown. A gear step is determined by a corresponding clutch/brake combination. The coordination of the clutch logic to the gear step can be seen in FIG. 2. Thus, e.g. in a downshift from the fourth to the third gear the brake C is closed and the clutch E deactivated. As will further be seen from Table 2, the gear shifts from the second up to the fifth gear are each carried out as overlapping gear shifts. Since the mechanical part is not relevant for the better understanding of the invention, a detailed description is omitted.

According to input variables 18 to 20, the electronic transmission control 13 selects a corresponding gear. The electronic transmission control 13 then activates, via the hydraulic control unit 21, a corresponding clutch/brake combination in which electromagnetic actuators are located. During the gear shifts, the electronic transmission control 13 determines the pressure curve of the clutches/brakes taking part in the gear shift. Blocks of the electronic transmission control 13 are shown in extensively simplified manner: micro-controller 14, memory 15, function block control actuators 16 and function block calculation 17. In memory 15 are deposited the data relevant to the transmission, e.g. programs and specific characteristic values of the vehicle and also diagnosis data. Usually memory 15 is designed as EPROM, EEPROM, or as buffered RAM. In the function block calculation 17, the data are calculated, relevant to gear shift curve. The function block control actuators 16 serves to control the actuators located in the hydraulic control unit 21. Input variables 20 are fed to the electronic transmission control 13. Input variables 20 are, e.g. a variable representing the driver's desired performance, such as eventually the accelerator pedal/throttle valve position or manual gear shift commands, the signal of the torque emitted by the internal combustion engine, the rotational speed and temperature of the internal combustion engine, etc. The specific data of the internal combustion engines are usually prepared by an engine control device. The latter is not shown in FIG. 1. The electronic transmission control 13 receives, as added input variables, the rotational speed of the turbine shaft 18 and of the transmission output shaft 19.

FIG. 3 consists of the parts FIGS. 3A to 3E. A downshift in traction followed by an upshift in coast are shown. The difference traction/coast is usually found with the aid of a characteristic field such as known from DE-OS 44 17 477, or with the aid of the transmission input torque. FIGS. 3A to 3E, respectively, show in the course of time: the variable DKI representing the driver's desired performance, gear change command SB, transmission input rotational speed curve nT, pressure curve of the first clutch pK1 and pressure curve of the second clutch pK2. The variable DKI representative of the driver's wish can be determined, e.g. from the accelerator pedal value, throttle valve value or from manually demanded downshifts by means of selector lever or switching lever.

Figure 3A:
Figure 3B:
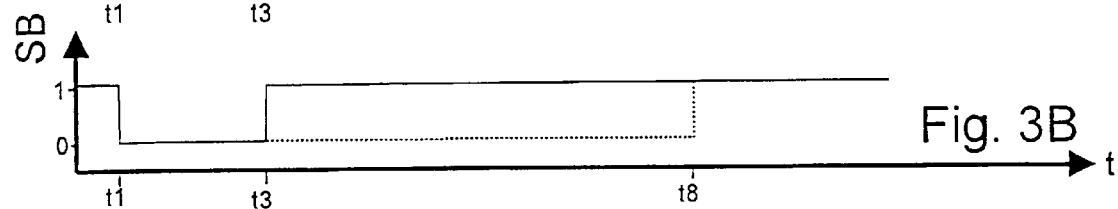
Figure 3C:
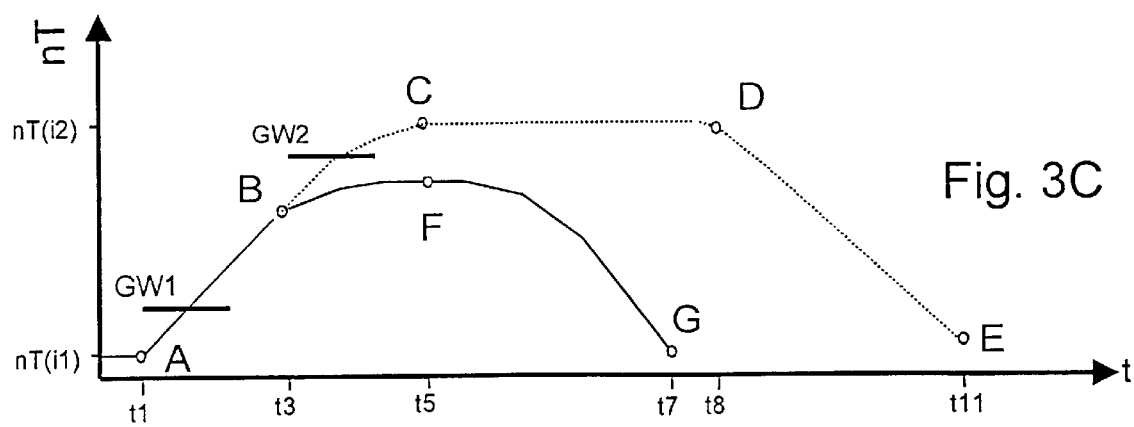
Figure 3D:
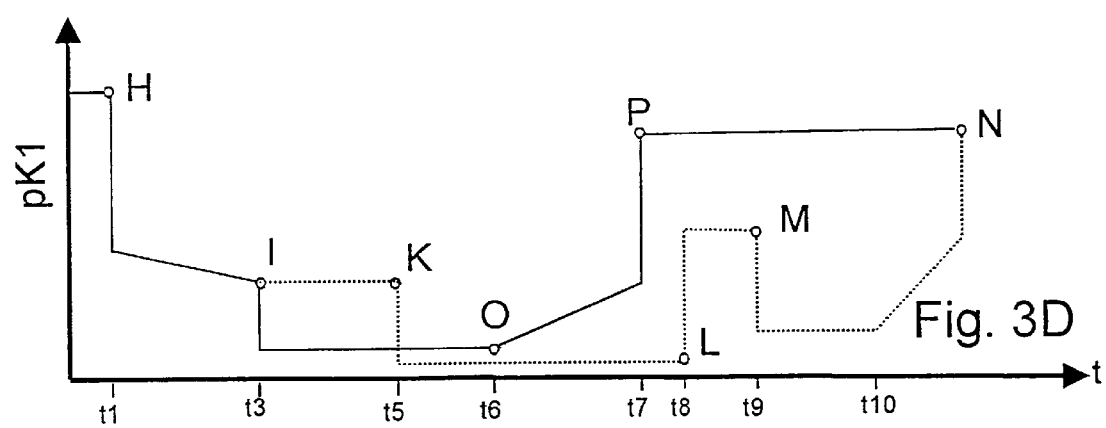
Figure 3E:
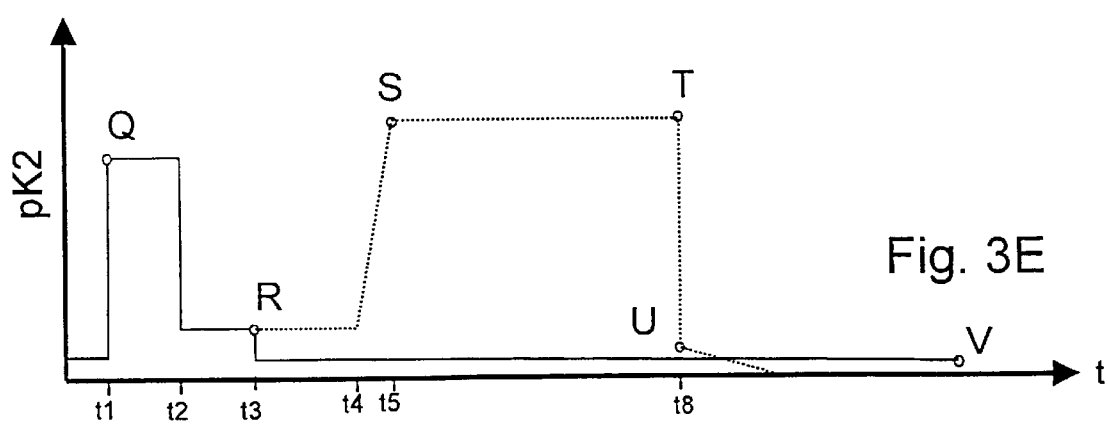

In FIGS. 3B to 3E, respectively, are shown two cases as examples wherein the curves in the course of time, according to the prior art, are shown in dotted lines and the curves in solid lines. The curve, according to the prior art, corresponds in FIG. 3C to the series of curves with the points A, B, C, D and E. In FIG. 3D, according to the prior art, the curve corresponds to the series of curves with the points H, K, L, M and N. In FIG. 3E, the curves, according to the prior art, corresponds to the series of curves with the points Q, R, S, T and U. Shown in FIG. 3C is a solution, according to the invention, with the series of curves and the points A, B, F and G. In FIG. 3D is shown a series of curves with points H, I, O, P and N, according to the invention. In FIG. 3E is shown a series of curves, according to the invention, with the points Q, R and V.

In the explanation of the two examples that follow, it is assumed that a driver is driving behind a second vehicle and intends to overtake it. The driver will introduce the overtaking operation, e.g. by very strongly actuating the accelerator pedal. It is assumed that the driver's desired performance exceeds a downshift characteristic line so that the automatic transmission carries out a downshift, e.g. from fifth to fourth gear. If the driver now realizes that in the first place he must allow to pass the traffic coming in opposite direction, he will immediately release the accelerator pedal. As a reaction to this an upshift from the fourth to fifth gear is carried out.

In the first example is described a curve according to the prior art. At moment t1, the driver introduces the overtaking operation. In FIG. 3A, the DKI value exceeds the value of a downshift characteristic line. As a consequence, the electronic transmission control will issue a downshift command, i.e. in FIG. 3B, the signal level changes from one to zero. By issuance of the gear shift command, the pressure level of the first clutch pK1 becomes reduced from a first level, according to point H, to a second level. Hereby the curve of the transmission input rotational speed nT changes at point A. Likewise, at moment t1, the second clutch is loaded with a rapid filling pressure, the pressure level here corresponds to the point Q until moment t2. In interval t2 to t3 runs the filling equalizing phase of the second clutch K2. At moment t3, the DKI value exceeds the upshift characteristic line. But according to the prior art, the downshift is first completely terminated. At moment t4, the pressure level of the second clutch becomes raised up to moment t5, pressure level corresponding to the point S. At moment t5, the transmission input rotational speed nT reaches the synchronous rotational speed value nT (i2) of the second gear i2. In FIG. 3C, this corresponds to the point C. The downshift from the first to the second gear is thus terminated. Thereafter follows a blocking time in interval t5 to t8. The blocking time is needed because it must be ensured that the first clutch K1 disengaged during the downshift operation has fully emptied. If this is not the case, then the rapid filling of the first clutch K1, now engaged again in the upshift, makes itself negatively noticeable in the form of a jolt. At moment t8, the electronic transmission control will then issue the upshift command. Hereby the signal curve changes from zero to one in FIG. 3B. The above described blocking time runs in the interval from t5 to t8. At moment t8, the first clutch is loaded with rapid filling pressure until moment t9 according to FIG. 3D. At the same time, the second clutch K2 is disengaged so that the pressure level of point T diminishes to the pressure level of point U. As can be seen in FIG. 3A, the DKI value is always at zero, i.e. the upshift is carried out as a coast upshift. In interval t9 to t10 runs the filling equalizing phase for the first clutch followed by a ramp and by change to normal pressure, point N. At moment t11, the transmission input rotational speed nT has reached the synchronous point nT (i1) of the first gear i1 corresponding to FIG. 3C, point E. The upshift is thus terminated.

The second example shows a solution according to the invention. The trace of curve in the interval t1 to t3 is here identical to the first example. The electronic transmission control issues the downshift command at moment t3. In FIG. 3B, the signal level changes from zero to one. As a consequence, the pressure level of the first clutch pK1 is reduced from the pressure level of point I to the pressure level of point O. Likewise, the pressure level of the second clutch pK2 is reduced at moment t3 from the level of point T to the pressure level of point V. As a result of the released accelerator pedal and of the opened clutches, the transmission input rotational speed nT will change according to the curve series BF, i.e. the internal combustion engine runs up loadless. At the point F, the transmission input rotational speed nT will reach its maximum value. At moment t6, the pressure level of the first clutch at point O will rise ramp-like until the moment t7. At moment t7, the pressure level of the first clutch becomes increased, according to the pressure level of the point P, so that the first clutch K1, at the synchronizing point nT (i1) of the first gear i1, can reliably take up the load. The synchronizing point corresponds here to the point G in FIG. 3C. The gear shift is terminated at moment t7.

Compared to the prior art, according to the invention, the solution thus offers the advantage that the traction downshift and subsequent coast upshift are already terminated before moment t11, namely, at moment t7. The time interval t7 to t11 is thus to be regarded as an advantage in time in comparison to the prior art. Since the automatic transmission reacts to the driver's desired performance at an earlier point in time, the automatic transmission acts more spontaneously.

Figure 4A:
Figure 4B:
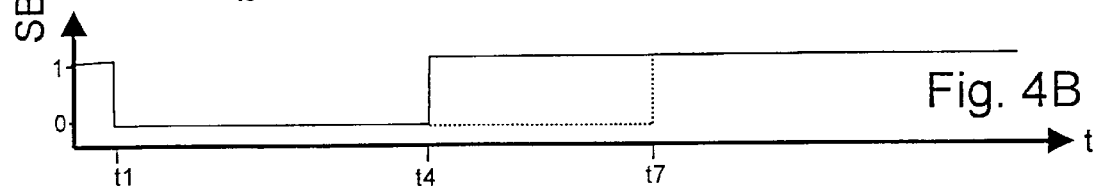
Figure 4C:
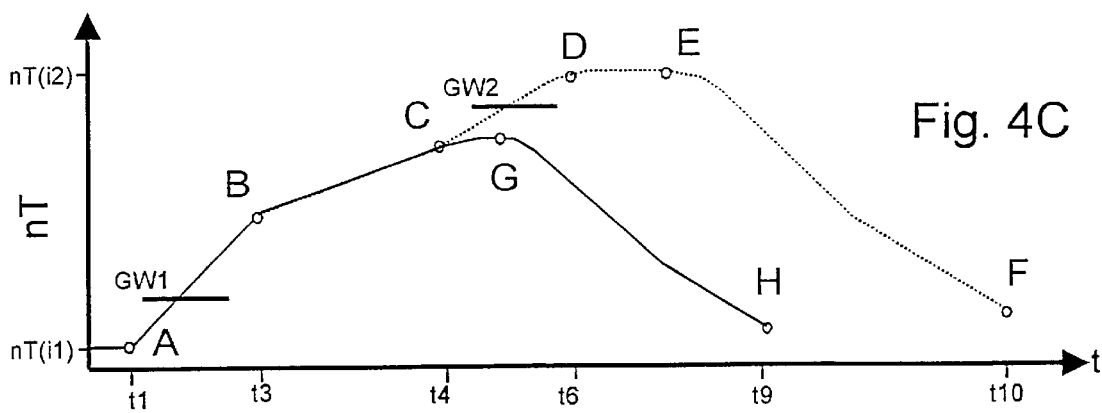
Figure 4:
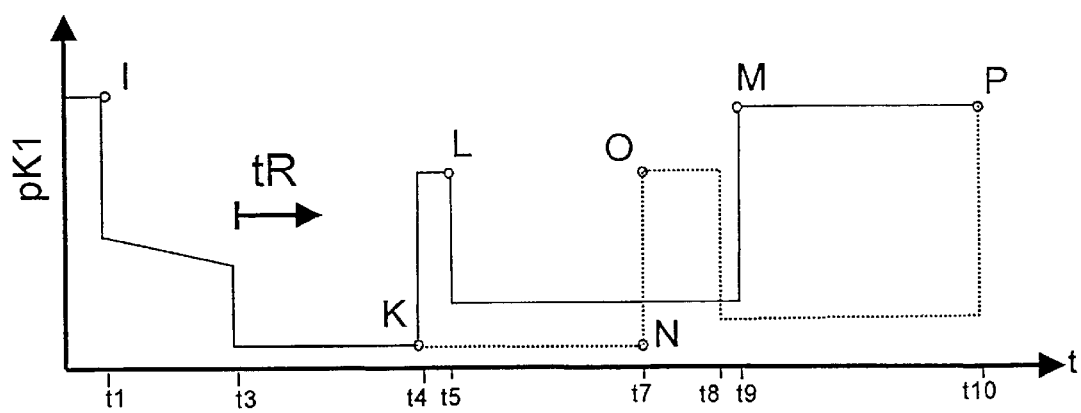
Figure 4E:
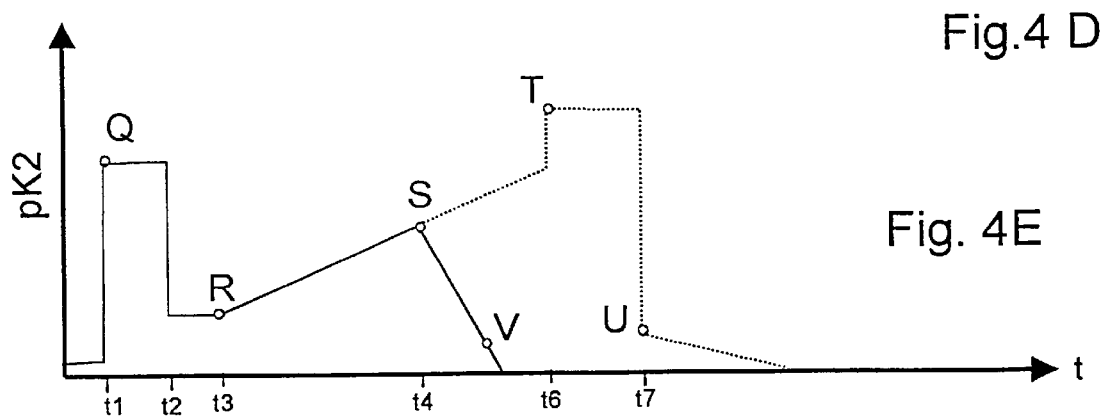

In FIG. 4, consisting of FIGS. 4A to 4E, is shown a second gear shift consisting of a traction downshift followed by a coast downshift and a coast upshift. A case of utilization taken from the practice is when a driver drives behind a vehicle and the accelerator pedal value, set by him, is near the traction/coast characteristic line and also a downshift characteristic line. In this case, a slight extension of the accelerator pedal position already results in a downshift and a light release in a change of the type of gear shift from a traction downshift to a coast downshift. There are shown, in turn, a curve trace according to the prior art (dotted line) and a curve trace according to the invention (solid line). In FIG. 4C, the curve trace shows with the points A, B, C, D, E and F a curve according to the prior art. Likewise, in FIG. 4D, the curve trace shows a curve with the points I, N, O and P according to the prior art. In FIG. 4E, likewise the curve shows a curve with the points Q, R, S, T and U according to the prior art. In FIG. 4C, the curve with the points A, B, C and H shows a curve according to the invention. In FIG. 4D, the curve with the points I, K, L, M and P shows a curve according to the invention. In FIG. 4E, the curve with the points Q, R, S and V likewise show a curve according to the invention.

In the first example is described the curve according to the prior art: at moment t1, the DKI value exceeds the value of a downshift characteristic line. Thereby the electronic transmission control will issue a downshift command, this is shown in FIG. 4B, by the level of the signal SB changing from one to zero. Also at moment t1, the first clutch K1 is reduced from a first pressure level, corresponding to the point I, to a second pressure level. At moment t1 until moment t2, the second clutch K2 is loaded with the rapid filling pressure, pressure level corresponding to point Q. At interval t2 to t3, the filling equalization phase runs for the second clutch K2. At moment t3, since the DKI value has decreased so sharply, it is assumed that the gear shift type changes, i.e. at moment t3 from the traction downshift to a coast downshift. At moment t3, the clutch K1 is disengaged. At the same time, a pressure ramp begins for the second clutch K2 at point R. The pressure ramp extends up to moment t6. Thereafter the pressure level is increased to that of point T. At moment t4, it is now assumed that the DKI value has exceeded an upshift characteristic line. But according to the prior art, the downshift is first fully carried out, i.e. the transmission input rotational speed will further increase until reaching the t6 moment the synchronizing point nT (i2) of the second gear. At moment t6, the pressure level of the second clutch pK2 is then increased to the pressure level corresponding to point T. Thereafter follows a blocking period up to moment t7 moment. At moment t7 up to moment t8, the first clutch is loaded with rapid filling equalization phase up to the t10 point. Likewise at moment t7, the pressure level of the second clutch pK2 is reduced sharply from the pressure level of the point T corresponding to the pressure level of the point U. Since the DKI value is substantially at zero, the transmission input rotational speed nT will decrease as a consequence thereof. At moment t10, the pressure level of the first clutch pK1 is increased to the level corresponding to point P so that the clutch takes over the motor load at the synchronizing point of the first gear. This pressure increase can also be carried out as a ramp.

In the second example is described the curve according to the invention: during the interval t1 to t4, the curves correspond to what has been described above. At moment t4, i.e. when the electronic transmission control issues the upshift command, the first clutch is loaded with rapid filling pressure up to moment t5. In FIG. 4B, the signal level SB changes from zero to one. At the same time, the pressure level of the second clutch decreases ramp-like from point S to point V. Due to the loadless state, the transmission input rotational speed nT no longer increases so sharply. It reaches its maximum value at the point G. The filling equalization phase of the first clutch runs in the time interval t5 to t9. At moment t9, the pressure level of the first clutch increases to a pressure level corresponding to the point M, since the transmission input rotational speed nT has reached the synchronizing point nT (i1) of the first gear in point H.

At moment t3, a time stage tR is started, see FIG. 4D. The time stage extends up to a maximum time, a reduction time being coordinated with each value of the time stage. The rapid filling time, the time interval t4 to t5 of the first clutch K1 to be now engaged again in the upshift, is changed in accordance with said reduction time. Thereby is taken into account the circumstance that in a quick sequence of a downshift with subsequent upshift, the first clutch K1 to be disengaged or again engaged in the upshift is still partly filled. By the variable rapid filling time is thus achieved that the clutch just only partly emptied comfortably close in the upshift without jolt.

According to the invention, the solution offers the advantage that the traction downshift, followed by coast downshift and subsequent coast upshift, is terminated before the moment t10, namely, at moment t9. Compared to the prior art, there thus results an advantage in the time interval t9 to t10. Since a close tie of the transmission behavior with the driver's desired performance is obtained here, the transmission thereby acts more spontaneously.

In the two embodiments according to the invention in FIGS. 3 and 4 additional limiting conditions were taken as point of departure:
1. The curve of the gradient of the transmission input rotational speed nT within a preset rotational speed channel.
2. When the abort criterion is detected, this corresponds to the DKI value at moment t3 if the actual transmission input rotational speed value nT is within a preset rotation speed range. The rotational speed range is defined by a first (GW1) and a second (GW2) limit value. The first limit value (GW1) is a function of the synchronous rotational speed value of the first gear. The second limit value (GW2) is function of the synchronous rotational speed value of the second gear. These two limit values can be calculated, e.g. according to the following equation:
3. GW1: nT(i1)+offset
   GW2: nT(12)−offset
   GW1: first limit value
   GW2: second limit value
   nT (i1): synchronous rotational speed value of the first gear
   nT (i2): synchronous rotational speed value of the second gear
   offset: absolute rotation speed value, for ex., 200 1/min or relative to difference nT (i2)−nT(i1)

| Reference numeral | |
|---|---|
| 1 driving unit | 12 transmission output shaft |
| 2 input shaft | 13 electronic transmission control |
| 3 hydrodynamic converter | 14 micro-controller |
| 4 impeller | 15 memory |
| 5 turbine wheel | 16 function block control actuators |
| 6 stator | 17 function block calculation |
| 7 converter clutch | 18 turbine rotational speed signal |
| 8 turbine shaft | 19 transmission rotational speed signal |
| 9 Revigneaux set | 20 input variables |
| 10 free wheel FL1 | 21 hydraulic control unit |
| 11 planetary gear set | |

What is claimed is:

1. A method for carrying out overlapping gear shifts in an electrohydraulically controlled automatic transmission during a gear down shift from a first gear (i1) to a second gear (i2), said method comprising the steps of:

opening a first clutch (K1);

closing a second clutch (K2);

detecting an abort criterion corresponding to an upshift demand, said demand being presettable by a driver;

interrupting the downshift; and returning to the first gear (i1);

wherein spontaneity of the automatic transmission increases by introducing the downshift without delay, interrupting the downshift without delay upon detection of the abort criterion, changing to an upshift without delay, and returning to the first gear (i1).

2. The method according to claim 1, comprising the steps of:

determining the abort criterion has been met;

testing an admissibility, said admissibility being met when an actual transmission input rotational speed (nT(t)) is within a rotational speed range having a first limit value (GW1) and a second limit value (GW2), said first limit value (GW1) being less than the input rotational speed (nT(t)), said second limit value (GW2) being gr eater than the input rotational speed (nT(t)), (GW1<nT(t)<GW2), s ai d first limit value (GW1) constituting a function of the synchronous rotational speed value of the first gear (GW1=f(nT(i1)), and said second limit value (GW2) constituting a function of the synchronous rotational speed value of the second gear (GW2=f(nT(i2))).

3. The method according to claim 2, comprising the step of:

testing whether a curve of a gradient of t he transmission input rotational speed (nT(Grad)) is within a preset rotational speed channel.

4. The method according to claim 1, comprising the steps of:

starting a time stage (tR) having values extending up to a maximum time (tMAX), upon issuance of a disengagement command for the first clutch (K1); and coordinating a reduction time for each value of the time stage (tR).

5. The method according to claim 4, comprising the step of:

changing a rapid filling time (tSF) of the first clutch (K1) for repeat engagement in the upshift, in accordance with the reduction time.

6. The method according to claim 5, comprising the step of:

changing the rapid filling time (tSF) such that a lesser value of the time stage (tR) causes a short rapid filling time (tSF).

7. A method for carrying out overlapping gear shifts in an electrohydraulically controlled automatic transmission during a gear downshift from a first gear (i1) to a second gear (i2), said method comprising the steps of:

issuing a downshift command via an electronic transmission control;

opening a first clutch (K1);

closing a second clutch (K2);

detecting an abort criterion corresponding to an upshift demand, said demand being presettable by a driver;

interrupting the downshift;

returning to the first gear (i1);

determining the abort criterion has been met; and providing a simultaneous hydraulic flow means for each of the first and second clutches;

wherein spontaneity of the automatic transmission increases by introducing the downshift without delay, interrupting the downshift without delay upon detection of the abort criterion, preventing the downshift from being completed, changing to an upshift without delay, and returning to the first gear (i1).

8. The method according to claim 7, comprising the steps of:

determining the abort criterion has been met;

testing an admissibility, said admissibility being met when an actual transmission input rotational speed (nT(t)) is within a rotational speed range having a first limit value (GW1) and a second limit value (GW2), said first limit value (GW1) being less than the input rotational speed (nT(t)), said second limit value (GW2) being greater than the input rotational speed (nT(t)), (GW1<nT(t)<GW2), said first limit value (GW1) constituting a function of the synchronous rotational speed value of the first gear (GW1=f(nT(i1))), and said second limit value (GW2) constituting a function of the synchronous rotational speed value of the second gear (GW2=f(nT(i2))).

9. The method according to claim 8, comprising the step of:

testing whether a curve of a gradient of the transmission input rotational speed (nT(Grad)) is within a preset rotational speed channel.

10. The method according to claim 7, comprising the steps of:

starting a time stage (tR) having values extending up to a maximum time (tMAX), upon issuance of a disengagement command for the first clutch (K1); and coordinating a reduction time for each value of the time stage (tR).

11. The method according to claim 10, comprising the step of:

changing a rapid filling time (tSF) of the first clutch (K1) for repeat engagement in the upshift, in accordance with the reduction time.

12. The method according to claim 1, comprising the step of:

changing the rapid filling time (tSF) such that a lesser value of the time stage (tR) causes a short rapid filling time (tSF).

* * * * *